Patented Feb. 1, 1949

2,460,581

UNITED STATES PATENT OFFICE 2,460,581

REACTION PRODUCTS OF THIURAM DISULFIDES AND ALKYLENE IMINES

Jacob Eden Jansen, Akron, Ohio, assignor to The B. F. Goodrich Company, New York, N. Y., a corporation of New York No Drawing. Application April 30, 1945, Serial No. 591,223

5 Claims. (Cl. 260—239)

This invention relates to new compositions of matter and more specifically it relates to the products of the reaction of an alkylene imine with a thiuram disulfide.

These products whose structures are not definitely known are useful as accelerators and activators of vulcanization of rubber. Among the rubbers which may be vulcanized with the help of these new compounds are all varieties of natural rubber such as caoutchouc, balata, gutta percha, latex, reclaimed rubber, artificial rubber isomers, and such synthetic rubbers as can be vulcanized with sulfur such as polymers of butadiene, isoprene, 2,3-dimethyl butadiene, piperylene and the like, and copolymers of these compounds with acrylonitrile, styrene, methyl acrylate, methyl methacrylate, isobutylene and other copolymerizable monomers. These new compounds may be added to the rubber on a roll mill, or in an internal mixer, or by any other suitable method. Other compounding ingredients such as any of the ordinary pigments, fillers, dyes, antioxidants or other accelerators of vulcanization may be employed with my new materials. Small quantities may be used to achieve the desired results, either as vulcanization activators or accelerators. In general, 0.1 to 5% or more, based on the rubber composition, may be used along with similar proportion of sulfur or a sulfur donor, or even more if a hard vulcanized rubber is to be made.

According to the preferred procedure of my invention, these reaction products are prepared by reacting two molecular portions of an alkylene imine with one molecular portion of a thiuram disulfide having at least one active hydrogen in an amino group in the presence of any of the commonly used reaction diluents such as water, benzene, alcohol and the like. The reaction will take place in the absence of a diluent, but the reaction rate is then so fast that it is difficult to control. Therefore, for optimum operating conditions, a reaction diluent is desirable. It has been found that the reaction will progress even at room temperature, and the heat of reaction will be removed sufficiently by a cold water bath to maintain a reaction temperature below 30° C.

Alkylene imines will react with these thiuram disulfides in other proportions than that given above. If desired, the ratio can be changed to equimolecular portions, or the alkylene imine can be increased above the two-to-one ratio. It will be understood that varying the imine to disulfide ratio will produce products having properties generally the same as those of the preferred product described above.

The following specific examples will serve more fully to illustrate my invention.

Example I 18.4 grams of unsubstituted thiuram disulfide (0.1 gram molecular equivalents) are suspended in 150 ml. of methanol in a three-neck flask fitted with an agitator, a thermometer and a dropping funnel. 8.6 grams of ethylene imine (0.2 gram molecular equivalents) are dissolved in 50 ml. of methanol. This solution is added slowly to the disulfide suspension with stirring while the reaction flask remains immersed in a cold water bath to maintain a reaction temperature not greater than 35° C. The imine solution is added over a period of 25 minutes. Some of the disulfide is still in suspension. 2 grams excess of imine is added and the reaction mixture is allowed to stand 20 minutes during which time the reaction medium clears and an oily material settles out. The oily product is separated from the reaction medium by evaporating the methanol at reduced pressure at 25° C. and the resulting thick, clear, yellow pourable oil weighs 26.5 grams having a refractive index at 25° C. of 1.6625.

Example II 18.4 grams (0.1 gram molecular equivalents) of unsubstituted thiuram disulfide are suspended in 150 ml. of methanol in a reaction flask fitted with a stirrer, a thermometer and a dropping funnel, and placed in a water bath for cooling. 17.2 grams (0.4 gram molecular equivalents) of ethylene imine are added dropwise over a period of 20 minutes while maintaining a reaction temperature of not over 35° C. The water bath is removed and stirring continued over a period of 40 minutes after which the methanol is removed under reduced pressure at 25 to 30° C. The resulting reaction product is a viscous, clear, dark oil weighing 35 grams having an index of refraction of 1.6275 at 25° C.

Example III 17.4 grams of dicyclohexyl thiuram disulfide (0.05 gram molecular equivalents) are suspended in 150 ml. of methanol as in Example II. 4.3 grams of ethylene imine are added over a period of 5 minutes with no temperature change in the reaction mixture. After stirring for 20 minutes longer, the temperature rose from 27° C. to 33° C. and remained at 32 to 33° C. for 20 minutes and then falls slowly and complete solution is effected. The mixture is stirred two hours longer. The very viscous reaction product which contains some solid material is separated from the methanol by removing the methanol under reduced pressure at 25° C. The reaction product weighs 21 grams.

Other three-membered ring alkylene imines that can be substituted for ethylene imine in the above examples without departing from the scope of my invention are the homologous hydrocarbon-substituted ethylene imines, such as propylene imine and the like.

Similar reaction products may be obtained by replacing the unsubstituted thiuram disulfide in the above examples with any thiuram disulfide having at least one active hydrogen atom in an amino group derived from dithiocarbamates of primary amines, such as dimethyl thiuram disulfide, trimethyl thiuram disulfide, dimethyl ethyl thiuram disulfide, triphenyl thiuram disulfide, diphenyl tolyl thiuram disulfide and other alkyl- or aryl-substituted thiuram disulfides. These reaction products will be produced with results equal to that in the above examples.

The products of the reaction between alkylene imines and thiuram disulfides are all good vulcanization accelerators. As an indication of the ability of these compounds to accelerate the vulcanization of rubber, the following example illustrates the effect produced in rubber by the product of the reaction between unsubstituted thiuram disulfide and ethylene imine. A typical "high gum" stock of the following composition, in which the parts are by weight, was prepared:

| | Parts |
|---|---|
| Natural rubber | 100.0 |
| Zinc oxide | 5.0 |
| Sulfur | 3.0 |
| Stearic acid | 1.0 |
| Thiuram disulfide ethylene imine reaction product | 1.0 |

After vulcanization in a press at 287° F., the composition had the physical properties as shown in the following table, in which T is the ultimate tensile strength in lb./sq. in. and E is the ultimate elongation in percent.

| Time of vulcanization in minutes | T | E |
|---|---|---|
| 15 | 1,570 | 890 |
| 30 | 2,250 | 895 |
| 60 | 2,570 | 840 |
| 120 | 2,420 | 825 |

The above composition vulcanized without a vulcanization accelerator would require 3 or more hours for vulcanization and would have a tensile strength of only about 1200 to 1400 lb./sq. in.

It would be possible to achieve equally as good results by employing other similar products of the reaction of any of the alkylene imines with any of the thiuram disulfides hereinabove mentioned.

While I have herein disclosed specific examples of this new class of compounds, I do not thereby desire or intend to limit myself solely thereto, for as hitherto stated, the precise portions of the materials utilized may be varied and other materials having equivalent chemical properties may be employed, if desired, without departing from the spirit and scope of the invention as defined in the appended claims.

I claim:

1. A viscous oily reaction product, useful as an accelerator and activator for the vulcanization of rubber, prepared by bringing together, in an inert liquid diluent, reactants consisting of one molecular proportion of a thiuram disulfide having at least one hydrogen atom in an amino group, and two to four molecular proportions of an alkylene imine, maintaining the reactants at a temperature between room temperature and about 35° C. until heat of reaction is no longer evolved, and then removing the inert diluent.

2. A viscous oily reaction product, useful as an accelerator and activator for the vulcanization of rubber, prepared by suspending, in an inert liquid diluent, one molecular proportion of a thiuram disulfide having at least one hydrogen atom in an amino group, adding to the resulting suspension two to four molecular proportions of ethylene imine, maintaining the resulting mixture at a temperature between room temperature and about 35° C., until heat of reaction is no longer evolved, and the removing the inert diluent.

3. A viscous, yellow, pourable oil, having a refractive index at 25° C. of 1.6625 and being useful as an accelerator and activator for the vulcanization of rubber, prepared by suspending in an inert liquid diluent one molecular portion of unsubstituted thiuram disulfide, adding to the resulting suspension two molecular proportions of ethylene imine, maintaining the resulting mixture at a temperature between room temperature and about 35° C., until heat of reaction is no longer evolved, and then removing the inert diluent.

4. A viscous, clear, dark oil, having a refractive index at 25° C. of 1.6275 and being useful as an accelerator and activator for the vulcanization of rubber, prepared by suspending in an inert liquid diluent one molecular portion of unsubstituted thiuram disulfide, adding to the resulting suspension four molecular portions of ethylene imine, maintaining the resulting mixture at a temperature between room temperature and about 35° C., until heat of reaction is no longer evolved, and then removing the inert diluent.

5. A viscous oily reaction product containing a minor portion of solid material and being useful as an accelerator and activator for the vulcanization of rubber, prepared by suspending in an inert liquid diluent one molecular portion of dicyclohexyl thiuram disulfide, adding to the resulting suspension two molecular proportions of ethylene imine, maintaining the resulting mixture at a temperature between room temperature and about 35° C., until heat of reaction is no longer evolved, and then removing the inert diluent.

JACOB EDEN JANSEN.

REFERENCES CITED

The following references are of record in the file of this patent:

UNITED STATES PATENTS

| Number | Name | Date |
|---|---|---|
| 1,551,042 | Miller | Aug. 25, 1925 |
| 1,613,573 | Bedford | Jan. 4, 1927 |
| 2,214,460 | Harman | Sept. 10, 1940 |

OTHER REFERENCES

Chemical Abstracts, vol. 35, page 6148 (1941).